United States Patent [19]
Richards

[11] Patent Number: 5,190,069
[45] Date of Patent: Mar. 2, 1993

[54] APPARATUS AND METHOD FOR DETECTING LEAKS

[76] Inventor: Raymond C. Richards, R.D. 1, Box 369, Potsdam, N.Y. 13676

[21] Appl. No.: 874,501

[22] Filed: Apr. 27, 1992

[51] Int. Cl.[5] .................... F17D 5/06; F16L 55/00; G08B 21/00
[52] U.S. Cl. .................... 137/312; 73/40.5 R; 73/49.1; 174/11 R; 340/604; 340/605
[58] Field of Search .............. 73/40.5 R, 49.1; 137/312; 174/11 R; 340/604, 605; 324/541, 544, 551, 554, 557

[56] References Cited

U.S. PATENT DOCUMENTS

| | | | |
|---|---|---|---|
| 1,962,168 | 6/1934 | Andrus | 340/605 |
| 2,056,085 | 9/1936 | Alles | 340/605 |
| 3,299,417 | 1/1967 | Sibthorpe | 73/49.1 |
| 3,721,898 | 3/1973 | Dragoumis et al. | 73/49.1 |
| 3,874,222 | 4/1975 | Ladd et al. | 340/605 |
| 3,907,336 | 9/1975 | Siegmund | 73/405 R |
| 4,332,170 | 6/1982 | Belval et al. | 340/605 |
| 4,468,609 | 8/1984 | Schmitz | 340/605 |
| 4,843,305 | 6/1989 | Akiba | 340/605 |
| 4,944,253 | 7/1990 | Bellofatto | 137/312 |

FOREIGN PATENT DOCUMENTS

| | | | |
|---|---|---|---|
| 2413996 | 3/1974 | Fed. Rep. of Germany | 174/11 R |
| 0045537 | 3/1983 | Japan | 340/605 |

*Primary Examiner*—George L. Walton
*Attorney, Agent, or Firm*—Wall and Roehrig

[57] ABSTRACT

A leak detection apparatus is shown for monitoring leakage from household water systems. Upon detection of a leak, the water supply valve is automatically shut off. A pair of spaced apart wires are imbedded in an insulating tape with liquid cell sensor elements formed at spaced intervals about uninsulated sections of the wires. The tape is placed about the pipe to be monitored so as to collect the leaking water within the liquid cell sensor elements to electrically connect the conductors within a cell. Electronic circuitry actuates a servo to turn off a supply valve and/or sound an alarm. The water collecting elements eliminate unintended alarms due to condensation.

14 Claims, 5 Drawing Sheets

APPARATUS AND METHOD FOR DETECTING LEAKS

BACKGROUND OF THE INVENTION

This application relates to an apparatus and method for detecting leaks, and more particularly to a liquid cell sensor, conductor tape and control for detecting leaks in domestic water and heating systems and for shutting off the water supply upon detection of a leak.

For a number of years, various leak detection systems have been proposed to detect the presence of hydrocarbons and other types of fluids that may contaminate the environment. These devices have included both sensors for detecting leaks in tanks, and elongated conductor sensors for detecting leaks along pipelines and the like. For the most part, the majority of these devices have been directed toward detecting leaks in gas and oil pipelines, storage tanks and other conveying vessels. Another area of concern, particularly to homeowners is leakage of water systems, whether domestic water, or heating systems in the home, particularly when the home is vacant in northern climates in cold weather. In addition to detecting a leak in a household water system, it is advantageous to automatically shut off the water supply as soon as a leak is detected.

OBJECTS AND SUMMARY OF THE INVENTION

It is an object of the present invention to provide a leak detection and shut off system for fluid supply and distribution systems.

It is another object of the present invention to provide a leak detection system for household water pipes and heating pipes which senses leaks therein and shuts off the source of water supply upon detection of a leak.

It is another object of the present invention to provide a leak detection system that may be economically and readily applied to the pipes of a household to rapidly detect a leak and actuate an alarm to indicate generally where within the household water distribution system the leak is occurring.

It is another object of the present invention to provide a method and apparatus for the automatic detection of leaks and the automatic shutting off of the supply to the leaking system component.

These and other and further objects of the present invention are accomplished in one embodiment by the provision of an elongated sensor cable having a pair of conducting wires embedded therein and insulated from each other, extending along the pipe to be monitored for leaks. A number of sensing cells are formed in the molded conductor strip at spaced intervals therealong to provide collection points for leaking liquid. The conductors within the cells are uninsulated and when exposed to a sufficient quantity of the leaking fluid, actuate the leak monitoring control circuitry to indicate a leak condition and/or take other appropriate action.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF A PREFERRED EMBODIMENT

Figure 1:
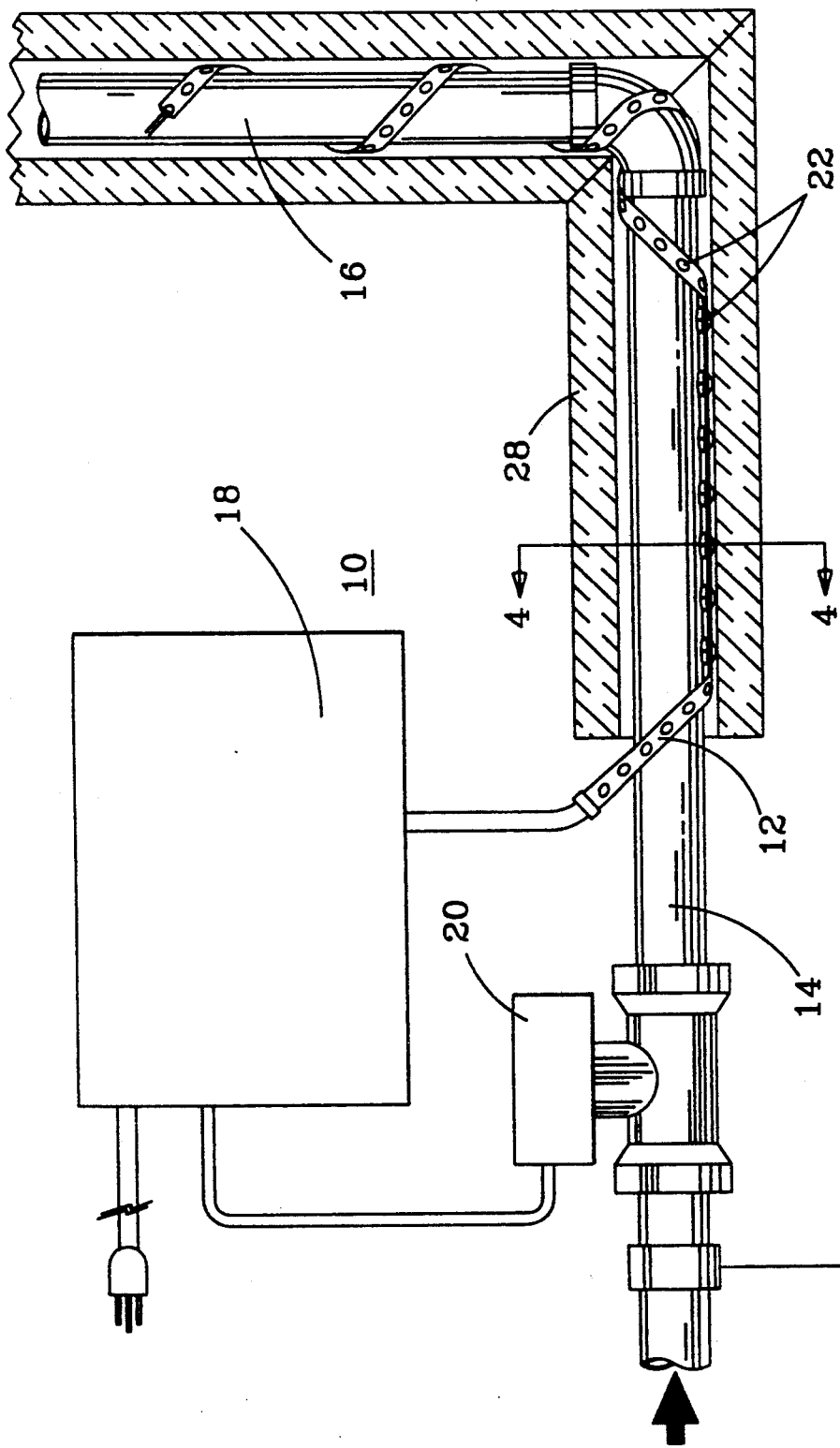
FIG. 1 is a diagrammatic view of the leak detection system of the present invention.

Referring now to FIG. 1 the water detection device 10 according to the present invention has an elongated detector tape 12 positioned about the pipes it is desired to monitor for leakage. Tape 12 extends along the bottom of horizontal pipe 14 and is wrapped about vertical pipe 16. The detector tape 12 is connected to a control box 18 which contains the electronic controls for sensing when a leak occurs along the tape 12 and for actuating a shut-off valve 20 to shut off the supply of water to the pipe 14 and 16. The detector tape 12 carries therealong a series of liquid cell sensor elements 22 shown in enlarged detail in FIG. 3 and has embedded therein a pair of spaced apart conductors 24 and 26.

The tape 12 is formed from a non-conductive material such as polyethylene plastic or other suitable material for carrying the wires 24 and 26 and the spaced apart cell sensor elements 22. The wires 24 and 26 within the bottom of the sensor cell 22, are stripped bare of insulating material so that as water accumulates in the bottom of the cell 22, a voltage on one wire will be transferred to the other through the water as it envelops both adjacent wires.

Figure 2:
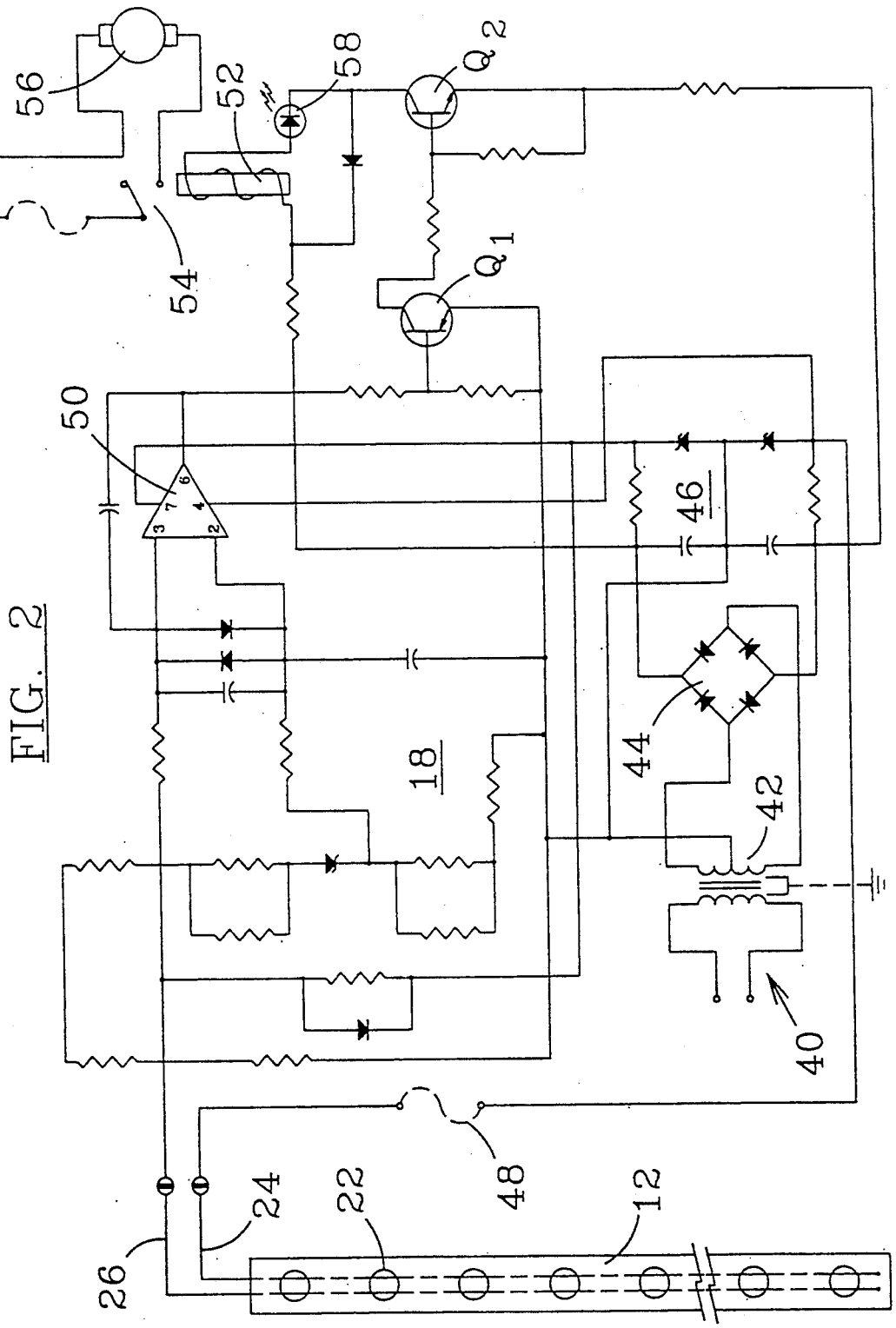
FIG. 2 is a schematic diagram of the control system of the present invention.
Figure 4:
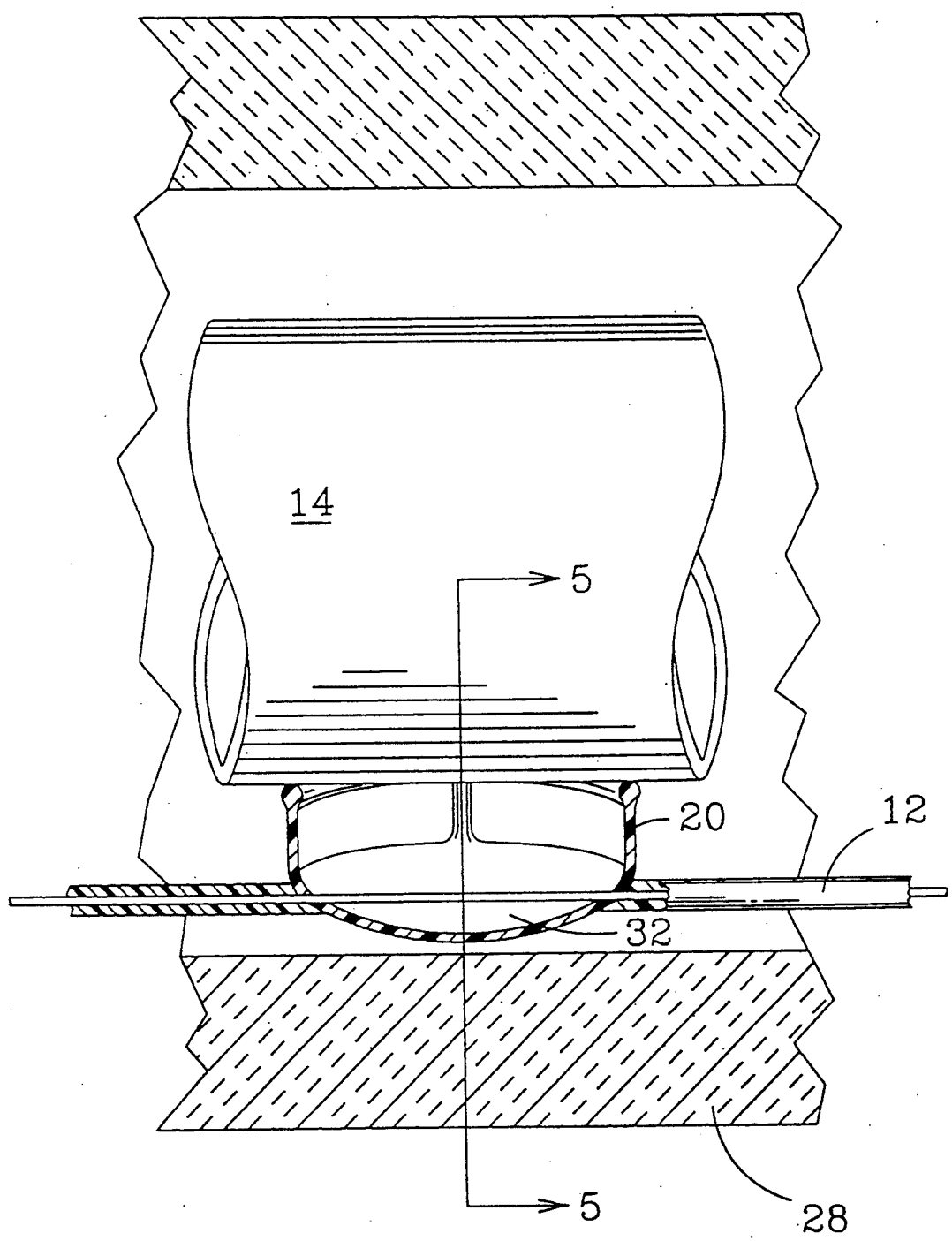
FIG. 4 is an enlarged, partially broken away cross-sectional view on line 4—4 of FIG. 1 of a liquid cell sensor element installed along a pipe.
Figure 5:
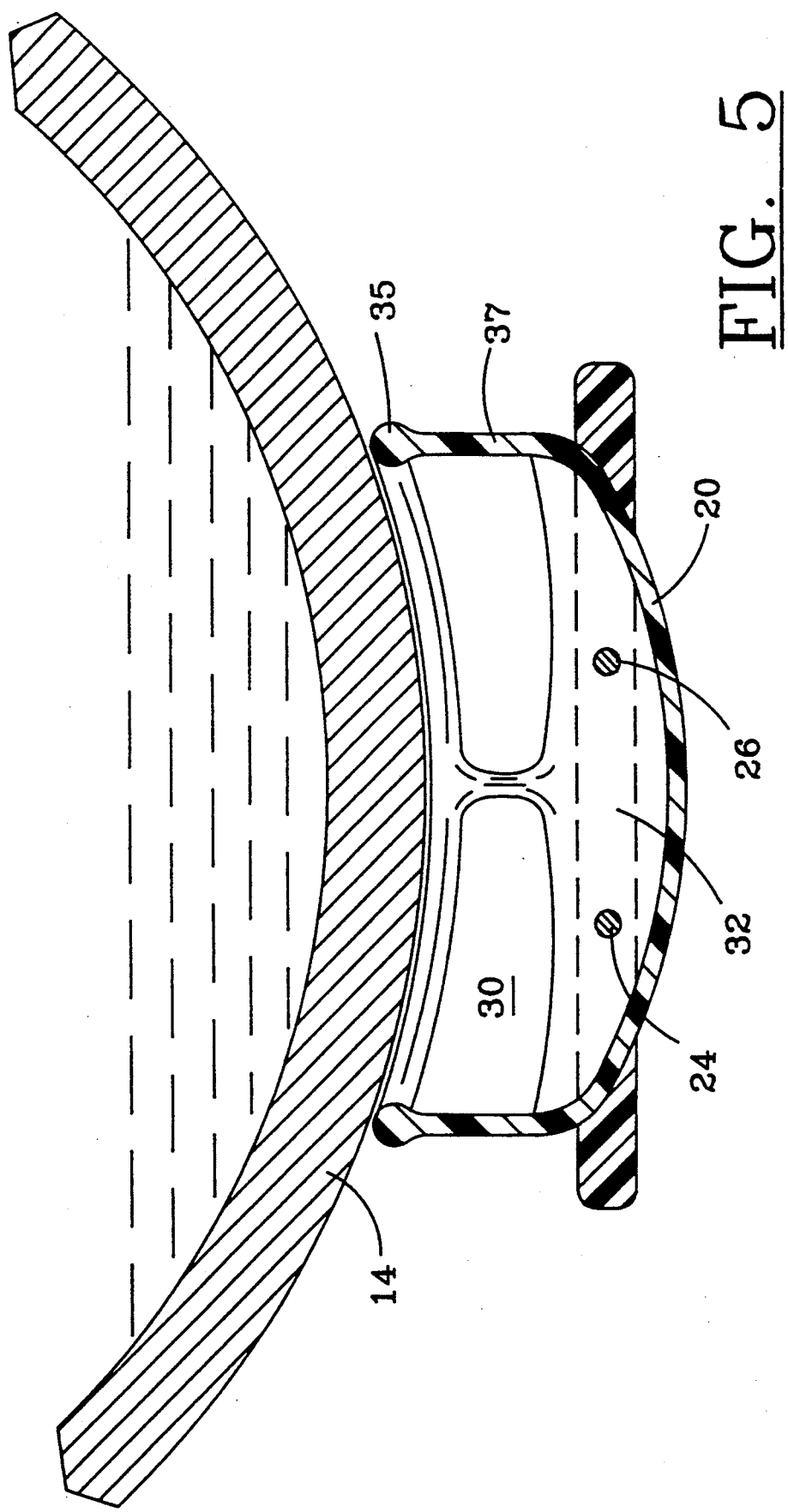
FIG. 5 is a partially enlarged sectional view on line 5—5 of FIG. 4.

The detector tape 12 is generally spiraled around vertical pipes such as 16 in FIG. 1 or extended longitudinally along the bottom of horizontal pipes such as 14 in FIG. 2. The liquid cell sensor elements 22 act to form a collection point for leaking water or other fluid. As shown in FIGS. 1, 4 and 5, an outer insulation layer 28 may be provided about the pipes 14 and 16 with the detector tape 12 positioned underneath the insulation. This not only serves to hold the tape 12 in position, but it also insulates the pipe itself, reducing any tendency for condensation to form on the pipe and saving energy. Generally speaking, leaking water or other fluid will tend to follow the pipe and will move toward the lowest point fairly rapidly, while only modestly soaking into the surrounding insulation. With the cells 22 spaced along the pipes, this leaking water collects in the cells 22 rather than saturating the insulation and actuates the alarm system much more promptly and efficiently.

The provision of the cells 22 at spaced intervals along the pipe insures not only prompt actuation, but prevents premature actuation. The alarm system will not be triggered until a sufficient amount of liquid is collected to clearly indicate a leak rather than merely random or occasional condensation. By providing the cells 22 at the spaced intervals along the pipe as it is wrapped with the insulation 28, they will tend to form localized pockets which in the usual horizontal position, will normally attract leaking liquid as it tends to flow to the lowest point adjacent the outer surface of the pipe. In those instances where the detector tape 12 is wrapped around a vertical pipe 16, again the cells 22 will form receptacles spaced about the pipe as it makes its vertical run so that any leaks will tend to find the nearest cell 22, lower than the leak, and immediately trigger the system, thus again preventing excessive leakage before actuation of the alarm and also to reducing false alarms due to condensation.

Figure 3:
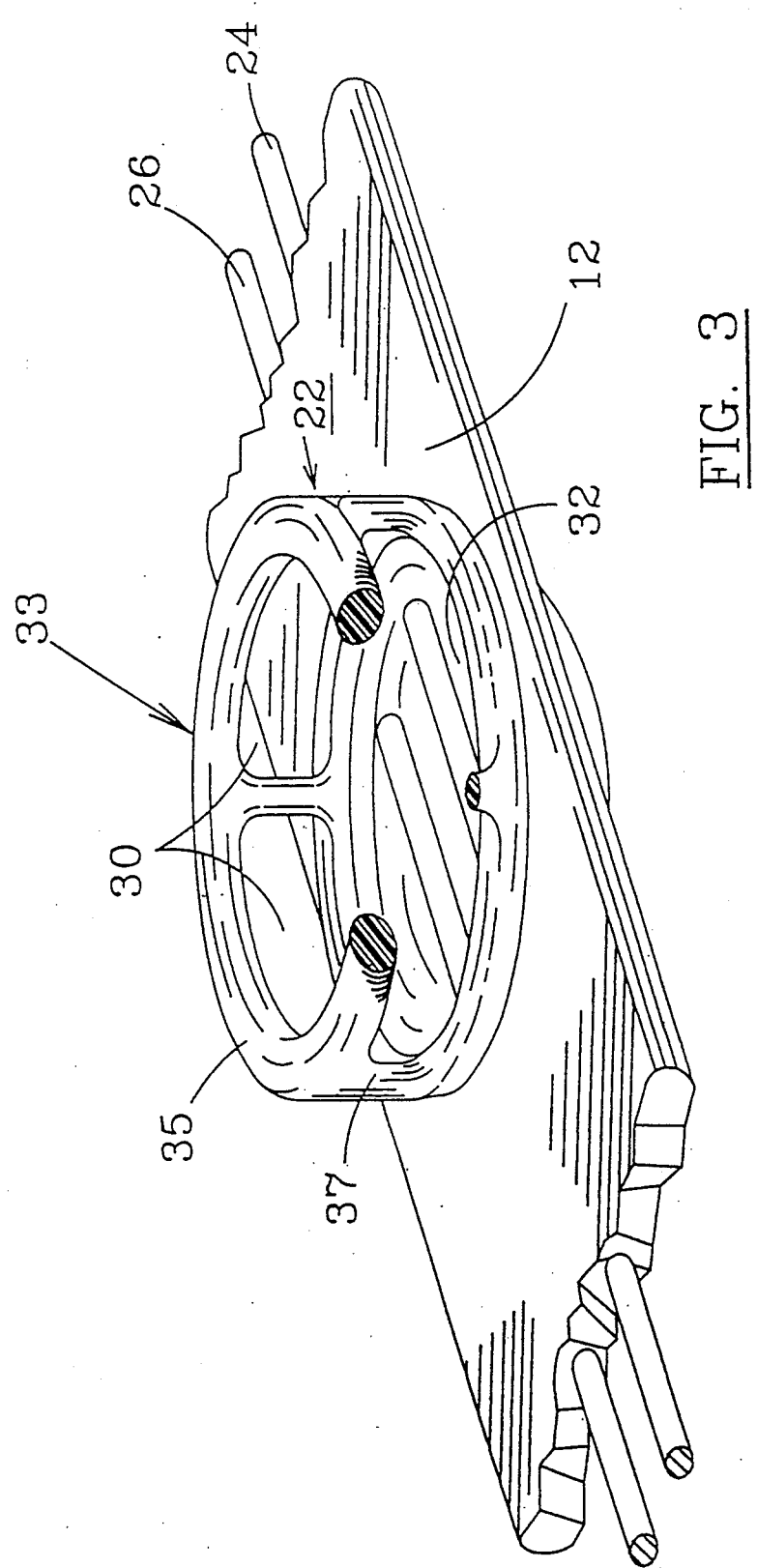
FIG. 3 is an enlarged perspective view of a liquid cell sensor element.

Referring now to FIG. 3, it can be seen that the tape 12 is a generally thin strip or band of a suitable insulating plastic material which is molded about a pair of conductors 24 and 26. The conductors 24 and 26 generally are very flexible, multi-strand wire having a very small diameter such that the tape and sensor cells can be easily wrapped around a pipe for a vertical run or positioned along the bottom of a pipe on a horizontal run. Molded into the web of the tape 12 at spaced intervals of a few inches to a foot or so, are the liquid cell sensor elements 22 which are formed generally of a similar plastic material. Cells 22 have a generally cup-shaped body with a bottom fluid collection chamber 32 and an upper standoff portion 33 formed by a top ring 35 spaced from the bottom by studs 37 to form the apertures 30 through which the leaking fluid can flow. Cells 22, in addition to liquid collectors, act as spacers or standoffs to hold the tape 12 from the pipe as may be seen in FIG. 4. Apertures 30 in the side walls thereof permit ready access from 360 degrees around the cell 22 to the fluid chamber 32 for the leaking water or other fluid. As can be seen better in FIGS. 4 and 5, the conductors 24 and 26 are spaced above the bottom of the chamber 32 so that a discrete amount of water must be collected in the sensor element 22 before a transfer of voltage can take place from one conductor 24 to the other conductor 26. The tape 12 may be formed in one embodiment by extruding the plastic about the wires to form an endless tape which can be wound on a reel or otherwise for storage. The liquid cell sensor elements 22 are molded into the web as it is extruded at the appropriate interval along the wires 24 and 26.

Referring now to FIG. 2 there is shown in circuit diagram form the control system for sensing changes in voltage from one conductor 24 to the other conductor 26 in the liquid detecting system of the present invention. The control system 18 comprises generally a power supply section 40 which includes a transformer 42 and a full wave bridge rectifier circuit 44. The transformer 42 is generally a step down transformer to convert the usual 110 volt line voltage available from the power company to a 24 volt secondary output which is then full wave rectified to provide a filtered plus and minus twelve volts to the rest of the control system 18. Plus or minus fifteen volts DC is also provided before the smoothing network 46 of the power supply section 40.

The minus twelve volts is fed through a fuse link 48 to the conductor 24 and out through the tape 12 to the end thereof. Conductors 24 and 26 are normally insulated one from the other. This voltage is applied only to the conductor 24. Conductor 26 is joined through an RC network to an Op Amp 50 which in the absence of any field voltage is held in a non-conducting state. The output of the Op Amp is connected through a pair of transistors Q1 and Q2 which when both are actuated energizes the solenoid 52 which in turn closes a contact 14 which actuates valve operating motor 56 to turn off the valve 20 when a leak is detected.

As may be seen in FIG. 2, when the minus twelve volts on conductor 24 is transferred through a liquid cell sensor element to the conductor 26, the Op Amp field voltage is changed so that the Op Amp conducts and causes the transistor Q1 to conduct. This in turn, causes transistor Q2 to conduct through solenoid 52 as indicated above. Thus, in operation as the pipe starts to leak, fluid will collect in the nearest adjacent liquid cell sensor element until it reaches a level in the chamber 32 sufficient to in effect short out between the conductors 24 and 26. This then transfers the negative twelve volts from conductor 24 to conductor 26 which causes the Op Amp to conduct to actuate the rest of the circuit as previously indicated. Suitable resistors, diodes and capacitors are provided across the input to the op amp to maintain the stability of the circuit and to insure accurate and prompt actuation of the alarm function.

In addition to the solenoid 52 operating to turn off the valve 20, a visual or audio alarm 58 can be provided to indicate to the monitoring personnel that the solenoid has been actuated and that the valve is being turned off. This can be located on the control system 18 or remotely as desired to indicate the status of the system and the types being monitored.

While I have shown this invention as being applied to a domestic water pipe, it should also be noted that this could be very easily applied to a hot water heating system or chilled water air conditioning system to monitor leakage so as to prevent damage from leakage and loss of water.

In one embodiment of the present invention it has been found advantageous to locate the cells 22 about every two inches along the length of the detector tape 12. The cells generally are about one-quarter inch in diameter and one-eighth inch deep. The gauge of wires 24 and 26 is chosen so that the resistance, of the length of the tape 12, will allow sufficient voltage to be applied to Op Amp 50 upon shorting of the wires 24 and 26 in a sensor cell. The wire gauge is determined by the material the wire is made of and the length of the run to be monitored.

Also, it should be understood that we have shown a single control system for monitoring a particular detector tape. Obviously, the circuitry of FIG. 2 could be readily duplicated within the control system 18 and additional tapes could be connected thereto with suitable output and alarm indicators, in accordance with FIG. 2. It thus would be possible to monitor several different zones of pipes within a standard household with perhaps one being the heating or cooling system and one being the domestic hot water system and another the cold water system etc. Not only will this system automatically shut off the water supply in the event of a leak, but when zoned as indicated it will help to pinpoint the location of the leak and speed repair.

When applying the present invention to pipes carrying a high temperature fluid, the material from which the detector tape 12 is made and the material out of which the liquid cells are made must be chosen so as to be able to withstand the temperature of the application. Similarly, if chilled water is being monitored, the materials must be appropriate to that application. The particular materials chosen are a matter of engineering design and well-known to those skilled in the art. Similarly, if a fluid other than water is being monitored, the liquid cell sensor elements and the tape material must be chosen so as not to be destroyed by the leaking fluid.

We have thus shown and described a leak detection apparatus for monitoring the leakage from a fluid system that is easy and economical to manufacture and simple to install and maintain.

While this invention has been explained with reference to the structure disclosed herein, it is not confined to the details set forth and this application is intended to cover any modifications and changes as may come within the scope of the following claims:

What is claimed is:

1. A leak detector for use in monitoring fluid containing structures, comprising:
    a pair of spaced apart electrical conductors, electrically insulated from one another by an electrical insulating material; and
    at least one detector cell, enclosing a portion of said conductors, said detector cell having a raised cup-shaped body portion that includes a top surface spaced apart from a bottom chamber by a side wall having at least one aperture defined therein through which leaking fluid can circulate, said top surface being adapted to contact with a surface of the structure being monitored, a bottom wall of said bottom chamber being spaced a predetermined distance below said enclosed portion of said conductors, and said enclosed portion of said conductors being noninsulated to expose said enclosed portion of said conductors to leaking fluid entering said cell and accumulating in said bottom chamber;
    whereby when a predetermined volume of fluid has accumulated in said chamber, said conductors are in contact with the fluid for allowing detection thereof.

2. The leak detector of claim 1, further comprising sensing means connected to said pair of conductors for detecting an electrical characteristic therebetween.

3. The lead detector of claim 2, wherein said sensing means comprises:
    means connected to one of said pair of conductors for applying a voltage thereto;
    circuit means connected to the other of said pair of conductors for producing an output signal in response to an electrical conductive path between said conductors.

4. The leak detector of claim 3, wherein:
    said means for applying a voltage and said circuit means comprises:
    a source of low DC voltage connected to one of said conductors;
    an operational amplifier having an input connected to the other of said conductors;
    at least one switching transistor and relay connected to an output of said operational amplifier and;
    an alarm connected to said relay,
    whereby upon appearance of low DC voltage on said input of said operational amplifier, said operational amplifier changes conduction state and causes said at least one switching transistor to activate said relay to actuate said alarm.

5. The lead detector of claim 4, wherein said alarm includes a motor actuated valve connected in a fluid input line to the structure being monitored; and
    said valve motor is connected to said relay and a source of power;
    so that upon detection of a leak said motor actuated valve is closed to prevent further fluid leads.

6. The lead detector of claim 3, further comprising control means, responsive to said circuit means, for actuating at least one of an alarm and a fluid shut off means.

7. The leak detector of claim 1, having a plurality of said detector cells.

8. The leak detector of claim 7 wherein said detector cells are made of a material impervious to attack by the fluid to be monitored.

9. The leak detector of claim 7 wherein said detector cells are formed of a material having thermal properties able to withstand the temperature of the structure being monitored.

10. The leak detector of claim 7 wherein said body portions have a diameter of approximately one quarter of an inch and a depth of approximately one-eighth of an inch.

11. A zoned leak detector system for use in monitoring fluid containing structures, comprising:
    a plurality of pairs of spaced apart electrical conductors, said conductors in each said pair being electrically insulated from one another by an electrical insulating material; and
    a plurality of detector cells, enclosing a portion of each of said paired conductors, said detector cells having a raised cup-shaped body portion that includes a top surface spaced apart from a bottom chamber by a side wall having at least one aperture defined therein through which leaking fluid can circulate, said top surface being adapted to contact with a surface of the structures being monitored, a bottom wall of said bottom chamber being spaced a predetermined distance below said enclosed portion of said conductors, and said enclosed portion of said conductors being noninsulated to expose said enclosed portion of said conductors to leaking fluid entering said cell and accumulating in said bottom chamber;
    whereby when a predetermined volume of fluid has accumulated in said chamber, said conductors are in contact with the fluid for allowing detection thereof.

12. The leak detector system of claim 11, further comprising sensing means connected to each said pair of conductors for detecting an electrical characteristic between said conductors in each said pair;

13. The leak detector of claim 12, wherein said sensing means comprises:
    means connected to one of said pair of conductors for applying a voltage thereto;
    circuit means connected to the other of said pair of conductors for producing an output signal in response to an electrical conductive path between said conductors.

14. The leak detector of claim 13, further comprising control means, responsive to said circuit means, for actuating at least one of an alarm and a fluid shut off means.

* * * * *